US006382600B1

(12) United States Patent
Mahr

(10) Patent No.: US 6,382,600 B1
(45) Date of Patent: May 7, 2002

(54) DEVICE FOR INTRODUCING A REDUCING AGENT INTO AN EXHAUST PIPE SEGMENT OF AN INTERNAL COMBUSTION ENGINE

(75) Inventor: Bernd Mahr, Plochingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/601,354

(22) PCT Filed: Jul. 23, 1999

(86) PCT No.: PCT/DE99/02269

§ 371 Date: Aug. 31, 2000

§ 102(e) Date: Aug. 31, 2000

(87) PCT Pub. No.: WO00/32302

PCT Pub. Date: Jun. 8, 2000

(30) Foreign Application Priority Data

Dec. 1, 1998 (DE) ........................................ 198 55 338

(51) Int. Cl.[7] .................................................. B01F 3/04

(52) U.S. Cl. ...................... 261/78.2; 261/115; 423/212; 423/239.1

(58) Field of Search .......................... 261/115, 28, 78.2, 261/DIG. 39; 423/239.1, 212

(56) References Cited

U.S. PATENT DOCUMENTS 3,353,335 A * 11/1967 Caballero .................. 261/115
5,176,325 A * 1/1993 Vidusek ...................... 261/115
5,431,893 A * 7/1995 Hug et al. ............... 423/234.1
5,603,453 A * 2/1997 Weaver et al. ................. 239/8

FOREIGN PATENT DOCUMENTS

EP 0381236 * 8/1990

* cited by examiner

*Primary Examiner*—C. Scott Bushey
(74) *Attorney, Agent, or Firm*—Ronald E. Greigg

(57) ABSTRACT

A device for introducing a reducing agent, such as a solution of water and urea, into an exhaust pipe segment of an internal combustion engine that leads to a reduction catalytic converter. The reducing agent is introduced into the exhaust pipe via a reducing agent line discharging into the exhaust pipe, and the orifice end of the reducing agent line is provided with a spray head, which has at least one spray opening and a tapering cross section.

20 Claims, 2 Drawing Sheets

DEVICE FOR INTRODUCING A REDUCING AGENT INTO AN EXHAUST PIPE SEGMENT OF AN INTERNAL COMBUSTION ENGINE

BACKGROUND OF THE INVENTION

The present invention relates to a device for introducing a reducing agent into an exhaust pipe segment of an internal combustion engine, which leads to a reduction catalytic converter, having a reducing agent line discharging into the exhaust pipe.

Regulatory requirements for ever-lower emissions values have led to extensive developments in the field of catalytic converters, especially for reducing nitrogen oxides in the exhaust gases. Reduction catalytic converters have proved to be especially promising. Especially in diesel engines, however, it has been found that in regeneration phases, a reducing agent enrichment of the exhaust gas is necessary.

A device or systems for post-treating exhaust gases is disclosed for instance from European Patent Disclosure EP-A-0 381 236, in which an ammonia or a urea is metered into the exhaust gas as a reducing agent. In this known system, via an injection valve, the reducing agent is injected into a premixing chamber that discharges into the exhaust pipe that leads to the reduction catalytic converter. In this generic device for introducing a reducing agent into an exhaust pipe segment of an internal combustion engine that leads to a reduction catalytic converter, the premixing chamber forms a reducing agent line that discharges into the exhaust pipe.

Although some of the reducing agent is delivered via a control valve to a transport line which discharges in the exhaust pipe that leads to the reducing catalytic converter.

From German Patent Disclosure DE-A1 196 25 447, a device for post treatment of exhaust gases of an internal combustion engine is known, in which to enhance the mode of operation of a downstream reducing catalytic converter, fuel as a reducing agent is via a meter valve and introduced into the exhaust pipe via an evaporator device. The evaporator device is a metal sleeve, provided with a glow plug, and having a face-end flow opening by way of which the evaporated reducing agent is introduced into the stream of exhaust gas. In this system, although the evaporation of reducing agent is thermally reinforced, nevertheless this version is technically complicated and requires high energy consumption for heating and evaporating the reducing agent.

OBJECT OF THE INVENTION

It is therefore the object of the invention to refine a device of this generic type for introducing a reducing agent into an exhaust pipe segment of the type defined at the outset, in such a way that good aerosol formation occurs over the widest possible performance graph range, so that the overall efficiency of the system is increased, or in other words lower $NO_x$ emissions are achieved.

SUMMARY OF THE INVENTION

In particular, in the device according to the invention for introducing a reducing agent into an exhaust pipe segment of an internal combustion engine, which leads to a reduction catalytic converter, and having a reducing agent line discharging into the exhaust pipe a spray head is provided having at least one spray opening and a tapering cross section, which spray head is disposed at the orifice end of the reducing agent line. Because of the at least one spray opening, the aerosol formation of the reducing agent can be improved drastically. Because the spray head has a tapering cross section, even slight quantities of reducing agent can be efficiently converted into an aerosol. This is because the tapering cross section causes the wall film that tears off when bending of the reducing agent line occurs reunited again upstream of the spray opening. Thus a continuous atomization can be attained in a controlled and controllable way.

Preferably, the cross section of the spray head tapers in accordance with a steady, smooth curve. As an example, parabolic functions or the like can be named, so that the spray head in particular forms a kind of spherical dome. Advantageously, the cross section of the spray head tapers at least partly linearly, and in particular a conelike dome is formed. In that case, the spray opening should be disposed at a location where a closed wall film exists even when the quantity of reducing agent is very slight.

To further improve the aerosol formation, the spray opening or each spray opening forms an angle with the axis of the spray head of at least 5° and especially preferably approximately 50°. The angle of the spray opening or openings depends, among other factors, on the spray cone formed, the size of the spray openings, the volumetric throughput of the spray openings, the exhaust pipe diameter, and the volumetric flow of exhaust gas.

In a preferred embodiment, a plurality of spray openings are provided, distributed circumferentially over the spray head. For example, eight spray openings may be provided, distributed at equal intervals along the circumference, so that the individual spray cones practically form a ring of aerosol fog, which assures an especially uniform distribution of the reducing agent in the exhaust gas.

Advantageously, the number of spray openings, the disposition, the orientation and/or the cross section of the spray opening or spray openings is dependent on the type and/or quantity of the exhaust gas and on the diameter of the exhaust pipe. In particular, at a high exhaust gas speed, the reducing agent line can be acted upon, for instance by a pump, the discharge rate and the aerosol formation of the reducing agent can be improved further, especially if because of the action upon it, a marked pressure difference exists between the reducing agent line and the exhaust pipe segment.

Further advantages and characteristics of the invention will become apparent from the ensuing detailed description of a currently preferred embodiment in conjunction with the accompanying drawing.

BRIEF DESCRIPTION OF THE DRAWINGS

FIG. 1 shows an exhaust pipe segment 2, which carries exhaust gases from an internal combustion engine to a reduction catalytic converter. A reducing agent line 4, which communicates with a reducing agent supply (not shown), discharges into the exhaust pipe segment 2. Possible reducing agents include not only hydrocarbons, such as diesel fuel or the like, but in particular solutions of urea and water, which can be introduced into the reducing agent line via an injection nozzle, a carburetor, or other metering devices, for example.

Figure 1:
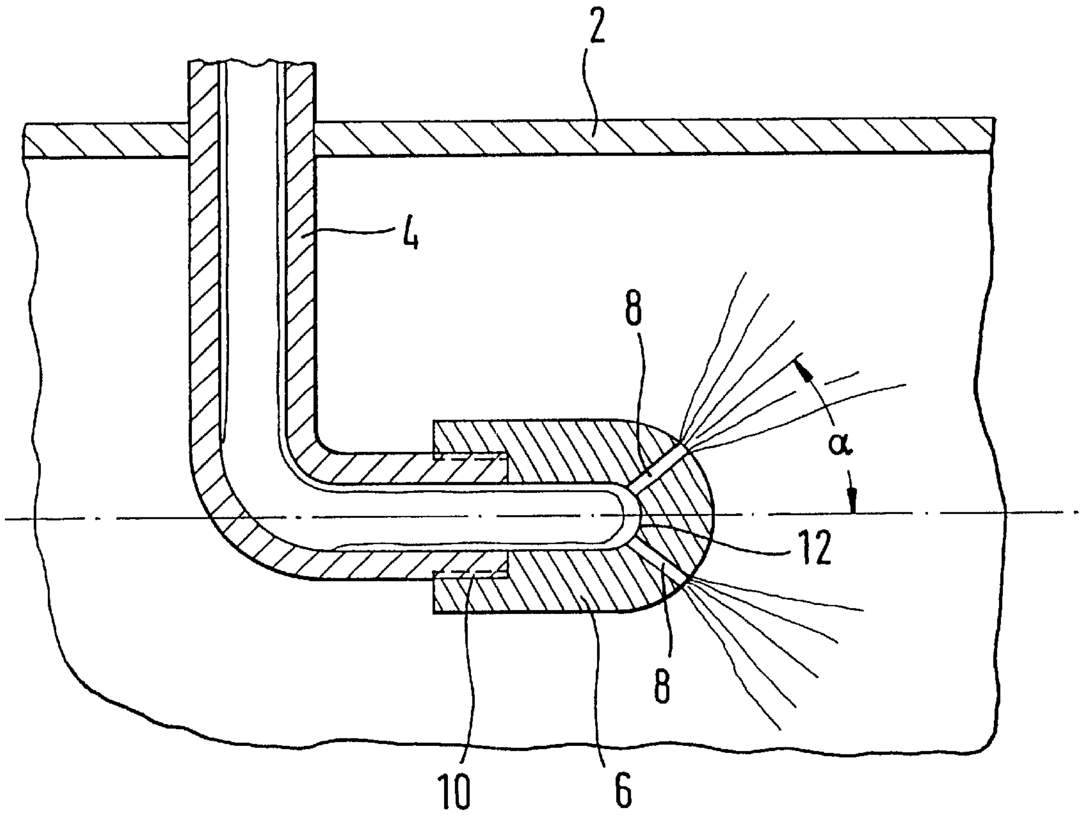
FIG. 1 shows a sectional view of an exhaust pipe segment with a device provided within it, for improving the aerosol formation of the reducing agent as a preferred embodiment of the invention, and having a spherically shaped spray head.

In the usual way per se, the reducing agent line 4 inside the exhaust pipe forms a bend, since as a rule the reducing agent is supposed to be discharged in the region of the highest exhaust gas speed, or in other words substantially in the middle of the exhaust pipe, and in a direction that is at least approximately equivalent to the flow of exhaust gas in the exhaust pipe 2. These pipe or line bends, at low quantities of reducing agent, such as a solution of urea and water, have the effect that a wall film that is formed on the reducing agent supply will tear off, because of different flow velocities in the reducing agent line, especially of air, exhaust gas or some other vehicle material by which the reducing agent is driven in the reducing agent line 4.

In order to reunite the torn-off wall film of reducing agent, a spray head 6 is provided in the embodiment shown, at the orifice end of the reducing agent line 4; the spray head can be screwed to the reducing agent line 4 via a thread 10, for example. However, it should be mentioned that other connection possibilities, for instance by adhesive bonding, soldering, or press-fitting, can also be employed. The inner wall of the spray head 6 is embodied, toward its end, as a tapering, for instance spherical face 12, so that individual components of the torn-off wall film of urea and water solution are brought together there and collected. In the region of the taper, two spray openings 8 are indicated in the embodiment shown; they form a certain angle with respect to the axis of the spray head. The choice of angle formed by the spray openings 8 with respect to the axis is dependent, among other factors, on the exhaust gas flow, the exhaust pipe diameter, the quantity of reducing agent, and the size and configuration of the spray openings 8.

In summary, it can be stated that with the spray head according to the invention, the quality of the aerosol formation is drastically improved, so that the total efficiency of the system, that is, $NO_x$ reduction, is improved. The system can be adapted to the most varied of engines by means of parameters with respect to the disposition, size and number of spray openings and the internal tapering of the spray head.

Figure 2:
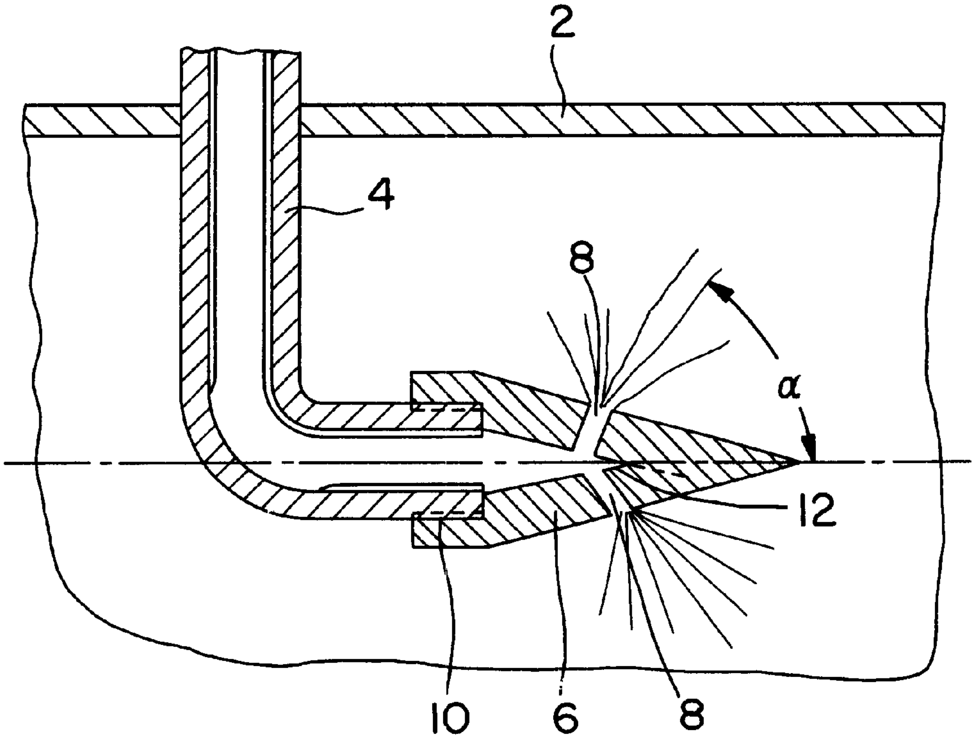
FIG. 2 shows a sectional view of an exhaust pipe segment with a device provided within it, for improving the aerosol formation of the reducing agent as a preferred embodiment of the invention, and having a conically shaped spray head.

FIG 2 shows a view similar to FIG. 1, but with the spray head 6 shown as a cone like dome. The openings 8 are shown in locations where a closed wall film exists, even when the quantity of reducing agent is very slight.

The improved quality of aerosol formation becomes understandable if one considers the following. Some of a reducing agent used can be atomized in a mixing chamber or mixing route, and moreover it forms a wall film. In small quantities of reducing agents, such as a water and urea solution, downstream of pipe bends, this wall film can become detached as a consequence of different flow velocities of the air used for carrying purposes. At the mouth of the reducing agent line, this incomplete wall film would be atomized by the compressed air, without the spray head of the invention. This would lead to a poorly controllable and sometimes inadequate atomization or aerosol formation of the metered reducing agent.

The foregoing relates to a preferred exemplary of embodiments of the invention, it being understood that other variants and embodiments thereof are possible within the spirit and scope of the invention, the latter defined by the appended claims.

I claim:

1. An apparatus for introducing a reducing agent into a portion of an exhaust pipe of an internal combustion engine, which portion leads to a reducing catalytic converter, having a reducing agent line discharging into the exhaust pipe, characterized in that a gaseous carrier material is delivered to the reducing agent line (4) upstream of the exhaust pipe (2) in order to drive the reducing agent through the reducing agent line; that inside the exhaust pipe at the discharge and of the reducing agent line (4), a spray head (6) that has a tapering cross section is disposed, having at least one spray opening, and the cross section of the spray head (6) tapers in accordance with a continuous smooth curve; and that the at least one spray opening (8) together with an axis of the spray head (6) forms an angle of at least 5°, so that if a wall film which has formed on the reducing agent line detaches, it is united with a film on the inner wall of the spray head, as a consequence of the tapering cross section, upstream of the spray opening, so that a continuous atomization can be attained by means of the at least one spray opening.

2. The apparatus of claim 1, characterized in that the cross section of the spray head (6) forms a spherical dome.

3. The apparatus of claim 1, characterized in that the cross section of the spray head (6) tapers linearly and forms a conical dome.

4. The apparatus of claim 1, characterized in that said angle is 50°.

5. The apparatus of claim 2, characterized in that said angle is 50°.

6. The apparatus of claim 3, characterized in that said angle is 50°.

7. The apparatus of claim 1, characterized in that a plurality of spray openings (8) are provided, distributed circumferentially on the spray head (5).

8. The apparatus of claim 2, characterized in that a plurality of spray openings (8) are provided, distributed circumferentially on the spray head (5).

9. The apparatus of claim 3, characterized in that a plurality of spray openings (8) are provided, distributed circumferentially on the spray head (5).

10. The apparatus of claim 4, characterized in that a plurality of spray openings (8) are provided, distributed circumferentially on the spray head (5).

11. The apparatus of claim 5, characterized in that a plurality of spray openings (8) are provided, distributed circumferentially on the spray head (5).

12. The apparatus of claim 6, characterized in that a plurality of spray openings (8) are provided, distributed circumferentially on the spray head (5).

13. The apparatus of one of claim 1, characterized in that the reducing agent line (4) can be acted upon by pressure.

14. The apparatus of one of claim 2, characterized in that the reducing agent line (4) can be acted upon by pressure.

15. The apparatus of one of claim 3, characterized in that the reducing agent line (4) can be acted upon by pressure.

16. The apparatus of one of claim 4, characterized in that the reducing agent line (4) can be acted upon by pressure.

17. The apparatus of one of claim 5, characterized in that the reducing agent line (4) can be acted upon by pressure.

18. The apparatus of one of claim 6, characterized in that the reducing agent line (4) can be acted upon by pressure.

19. The apparatus of one of claim 7, characterized in that the reducing agent line (4) can be acted upon by pressure.

20. The apparatus of one of claim 12, characterized in that the reducing agent line (4) can be acted upon by pressure.

* * * * *